Figure 1:
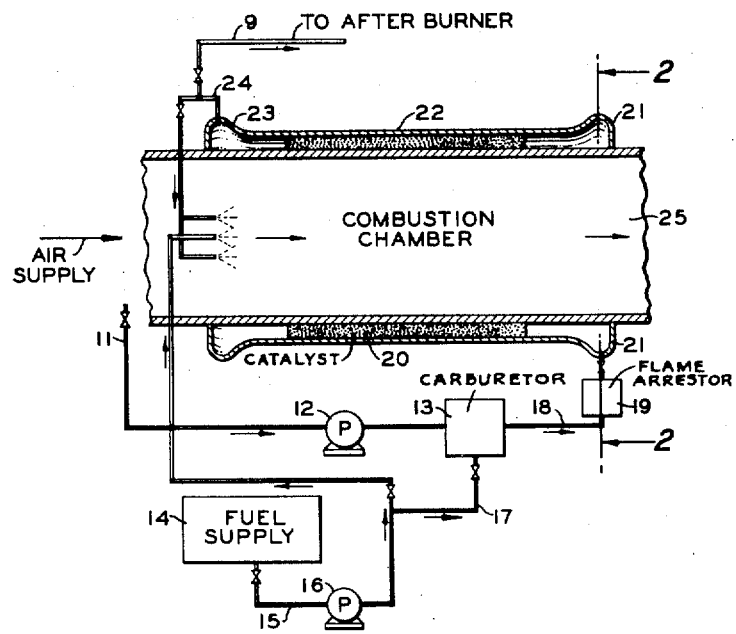

Oct. 20, 1953     D. E. CARR     2,655,786
METHOD OF OPERATING JET ENGINES WITH FUEL REFORMING
Filed Sept. 18, 1950     2 Sheets-Sheet 1

INVENTOR.
D. E. CARR
BY Hudson and Young
ATTORNEYS

Patented Oct. 20, 1953

2,655,786

UNITED STATES PATENT OFFICE 2,655,786

METHOD OF OPERATING JET ENGINES WITH FUEL REFORMING

Donald E. Carr, Bartlesville, Okla., assignor to Phillips Petroleum Company, a corporation of Delaware Application September 18, 1950, Serial No. 185,417

10 Claims. (Cl. 60—35.4)

This invention relates to jet engines. In one of its more specific aspects, it relates to a method for providing a superior fuel composition for jet engines. In another of its more specific aspects, it relates to the operation of continuous flow jet engines. In another of its more specific aspects, it relates to the operation of jet engines while reforming a portion of a hydrocarbon fuel therefor.

Jet engines have only in the last few years been used in large numbers for the purpose of propelling aircraft and they have been found to be highly advantageous for use in high speed planes. With the increase in use of such engines, however, a multitude of operational problems have also come to be recognized.

A jet engine comprises three general parts; first, an air intake section; second, a fuel addition and combustion section; and third, an exhaust section. The air intake section and means for effecting such air intake is roughly divided into three classes, i. e., the type found in a ram jet, a pulse jet, and a jet engine employing a rotating compressor, such as a turbine compressor operated by a gas turbine, as motivating power for introducing the air into the combustion section. These different types of air intake systems, though substantially different in mechanical form, all serve the same function in each engine, namely, providing the necessary air supply to the combustion section. The combustion section, including the fuel injection system and the exhaust system, are somewhat similar in each type of engine. The purpose of operation of each of the engine types is similar, namely, to burn the fuel and to utilize as much as possible of the heat energy added in producing thrust for the engine. The major difference in these combustion and exhaust sections is found when comparing the ram jet or pulse jet engine types with the gas turbine engine. In the gas turbine engine, the combustion gases pass through a turbine which utilizes part of the heat energy of the combustion gases in driving the air compressor so as to furnish additional air for the combustion zone. The gases then are exhausted to the atmosphere through the exhaust section or tail pipe with a concomitant production of thrust. In the case of the ram jet and pulse jet engines, the hot gases pass directly from the combustion section to the exhaust or tail pipe section and it is thus more difficult to establish as clear a line of demarcation between the zones of such engines.

The general trend of thought concerning the operation of jet engines has been that hydrocarbons do not vary sufficiently in their burning characteristics to make a material difference in the operation of any given jet engine. For that reason emphasis has for some time been placed on engine research so as to determine the design of a jet engine which would have such a structure as would overcome the multitude of operational difficulties which are inherently encountered in jet engines. Such operational difficulties have to date been only partially overcome by engine design.

Some of the problems which are encountered in the operation of such jet engines are exemplified by those encountered in a turbo-jet engine. Performance of a jet engine is dependent to a large extent upon the "temperature rise" which is obtainable in the particular engine. "Temperature rise" is that increase in temperature between the inlet to the combustor and the temperature of the gases at the combustor exhaust outlet. In a turbo-jet engine, the temperature rise must be carefully controlled for the operation of a turbo-jet engine is limited by the ability of the turbine blades to withstand high temperatures. Fuel which is supplied to the combustor is burned in the presence of supplied air and raises the temperature of the combustion gases and unused air by the heat of combustion. An excess of air is conventionally utilized in the operation of turbo-jet engines to control the temperature of the gases contacting the turbine blades. Such a large quantity of air is utilized in the operation of jet engines that the air flow reaches very high velocities. The high air velocities pose many additional problems in the operation of jet engines, which problems are very difficult to overcome. The hot gases are expanded and in the turbo-jet engine are expanded through the turbine section which provides power for the compressor. Further expansion of the gases in a turbo-jet engine, as well as in a ram jet or pulse jet engine, takes place in a rearwardly extending exhaust nozzle to provide a substantial increase in gas velocity. The thrust which is produced by the engine equals the gas mass flowing through the exhaust duct times its increase in speed according to the law of momentum.

For each engine speed at a given altitude, a certain temperature rise is required for the operation of any given jet engine. Combustor inlet pressure and mass air flow through the engine imposes a limitation upon the combustion of any fuel utilized in the operation of the engine. For each combination of combustor inlet pressure and mass air flow there exists for any given fuel a maximum attainable temperature rise which depends upon the combustor stability performance of that fuel under the combination of these conditions. As the operating conditions become more severe, a decrease in combustion stability is encountered. One phenomenon which tends to affect temperature rise in any given engine is known as "cycling." Cycling is an indication of instability of combustion of a given fuel. The flame front within the combustor tends to fluctuate back and forth and many times the instability reaches such a degree that the flame is finally extinguished. The point at which combustion will no longer be sustained is known as the "blow-out" or "cut-out" point. Rich mixture blow-out is the primary controlling characteristic of turbo-jet engine performance since it defines the maximum thrust output at a given altitude. When the temperature rise required at a given engine speed and at a given altitude corresponds to the maximum temperature rise obtainable with a given fuel, a very definite operational limit is imposed upon that jet engine when operating with that specific fuel. In order to operate the engine under more severe operating conditions, it is necessary therefore to obtain and use a fuel which has stable combustion characteristics over a broader range of conditions than the fuel with which the maximum limit of operation has been reached. Similar operational problems are encountered in pulse jet and ram jet engines.

It has been found that many of the operational problems of such jet engines are overcome to a large extent when those engines are operated with a particular hydrocarbon fuel. Hydrocarbon fuels, contrary to general belief, burn differently under different operating conditions. It will thus be seen that although stress has been placed upon research for mechanical design of jet engines, a further limitation is placed upon the individual engines by the particular fuel being utilized. A desirable jet engine fuel should be readily burnable and should facilitate maintenance of the flame in the combustion zone. The fuel should also produce a high thrust for each unit volume burned and should not cause difficulty such as fouling the engine or fuel injection system.

Hydrocarbon fuels which satisfactorily meet the above requirements should be rated in an order of desirability by their ability to impart heat to air entering the combustion zone while maintaining stable combustion therein. Fuels may be rated generally in their order of desirability by operating a particular burner under a particular set of operating conditions which include combustion zone inlet air temperature, mass rate of air flow, and constant outlet pressure. An increase in the rate of fuel addition, when the above conditions are fixed, increases the temperature rise of the air in the combustion zone up to a critical point and after that point has been reached any increase in fuel addition results in decreasing the temperature of the combustion gases. A comparison of the maximum temperature rise ($\Delta Tm$) with the $\Delta Tm$ obtained with two standard fuels, normal heptane and 2,2,4-trimethylpentane (isooctane) obtained in the same burner and under the same operating conditions makes possible the rating of the tested fuel under such operating conditions. Assigning n-heptane and isooctane arbitrary values of combustion stability of 100 and 0, respectively, the relative combustion stability rating of the test fuel is calculated from the following relation:

$$\sigma = \frac{\Delta Tm,f - \Delta Tm,o}{\Delta Tm,n - \Delta Tm,o} \times 100$$

where $\sigma$ = Combustion stability rating
$\Delta Tm,f$ = Maximum stable temperature rise of the test fuel at the test conditions
$\Delta Tm,o$ = Maximum stable temperature rise of isooctane at the test conditions
$\Delta Tm,n$ = Maximum stable temperature rise of n-heptane at the test conditions Quantitively there is no known correlation between flame speed and combustion stability. Qualitatively, however, an increase in flame speed results in an increase in combustion stability, other factors affecting combustion, such as fuel distribution, combustion design, etc., being equal.

I have conceived a method of operating a jet engine with a single fuel which includes the step of materially increasing the flame speed of the fuel which is introduced into the combustion zone over that possessed by the original fuel. This increase in flame speed of the fuel provides a considerably better combustion stability to the fuel introduced into the combustion zone than is possessed by the original fuel before being subjected to my method of engine operation.

Best operation of turbojet engines is obtained by introduction of a portion of the fuel into what is known as an afterburner. In a sense an afterburner can be regarded as a ramjet connected to the downstream end of an ordinary turbojet. Afterburners operate at a lower oxygen content than the primary combustion zones of such engines. Under such conditions blow-out is one of the serious problems encountered therein. By my method of jet engine operation flame speed obtained within the afterburner is increased with a resulting increase in combustion stability therein.

Broadly speaking, this invention comprises an improved method for the operation of jet engines so as to provide a means of increasing the flame speed of the combustible mixture introduced into the combustion zone. This method of operation comprises the steps of reforming at least a portion of a selected hydrocarbon fuel in the presence of a deficiency of oxygen compared to that which is required for complete combustion, thus forming a mixture containing a substantial amount of hydrogen. The mixture resulting from the reformation of the hydrocarbon fuel is added to the remaining air and fuel in the combustion zone and the total fuel mixture is burned in the combustion zone. The presence of the hydrogen in the combustible mixture substantially increases the overall fuel flame speed and thereby decreases proportionately the volume of the combustion zone required by the engine.

An object of this invention is to provide an improved method for operating jet engines. Another object of the invention is to provide an improved method for operating pulse jet engines. Another object of the invention is to provide an improved method for operating turbo-jet engines. Another object of the invention is to provide an improved method for operating ram jet engines. Another object of the invention is to provide a method of operating jet engines by which at least a portion of the hydrocarbon fuel is reformed to form a fuel mixture containing a substantial amount of hydrogen. Another object of the invention is to provide a method of operating jet engines by which many of the inherent defects of operation are obviated. Another object of the invention is to provide a jet engine fuel which has highly desirable flame propagation characteristics. Other and further objects and advantages will be apparent to those skilled in the art upon study of the accompanying disclosure.

The reforming of the hydrocarbon fuel for a jet engine may be effected either thermally or catalytically during operation of that engine. The hydrocarbon fuel to be reformed is preferably mixed with air in such a proportion that the oxygen present in the mixture is an amount equivalent to at least 0.6 mol and preferably not more than 1.0 mol per atom of carbon. In all instances, the amount of air which is used in the fuel reformation is less than that theoretically required for complete combustion. By this reforming, the hydrocarbon is converted to a mixture comprising a substantial amount of hydrogen which has an intrinsic flame speed much higher by comparison than the original hydrocarbon fuel. By conducting the fuel reformation within the above limits of oxygen, the predominant reaction is that of the conversion of carbon to an oxide of carbon, namely carbon monoxide, and the formation of molecular hydrogen.

When it is desired to catalytically reform the fuel, nickel is a preferred catalyst therefor. A catalyst suitable for reforming the hydrocarbon fuel may be formed, for example, by spraying aqueous nickel nitrate on a support, such as pumice, heating the impregnated pumice to decompose the nickel nitrate to nickel oxide, and subsequently reducing the nickel oxide to nickel. The catalyst so produced is then placed in a reforming zone of the jet engine and the reforming reaction is carried out over it. Other reforming catalysts, such as iron or alumina, may be utilized in the reformer chamber. Regeneration of the catalyst is satisfactorily obtained by shutting off the flow of hydrocarbon feed to the reformer chamber and subjecting the catalyst to a flow of oxygen.

The reforming reactors are preferably made of stainless steels such as 18–8 or 25–20 steels, or other materials which can withstand the elevated temperatures sufficiently to offer a reasonable length of useful life. Temperatures of 1860° R to 2400° R are used in the reforming zone when a catalyst is present, and in the absence of a catalyst, temperatures in the range of 2460° R to 3000° R are utilized. Higher temperatures may be used in each instance, however. Inasmuch as the greatest possible temperature rise through the length of the jet engine is desired, catalytic reformation of the fuel at the lower temperature is desired. The actual temperature at which the fuel reformation is accomplished is dependent upon the fuel through-put, length of the reforming chamber and amount of heat exchange which the reforming chamber has with a cooling atmosphere, such as the surrounding air.

Figure 2:
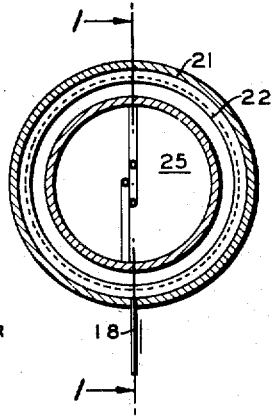
Figure 3:
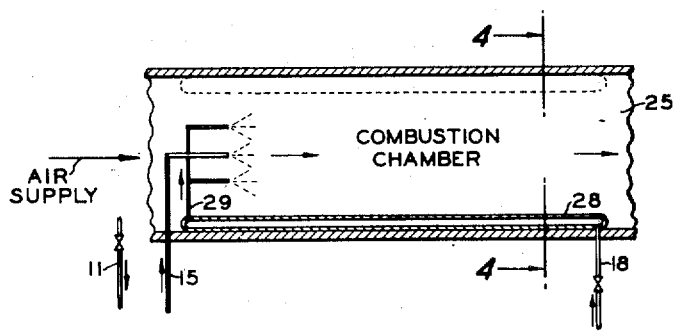
Figure 4:
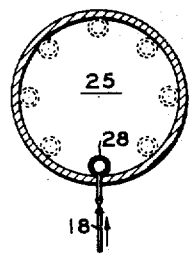
Figure 5:
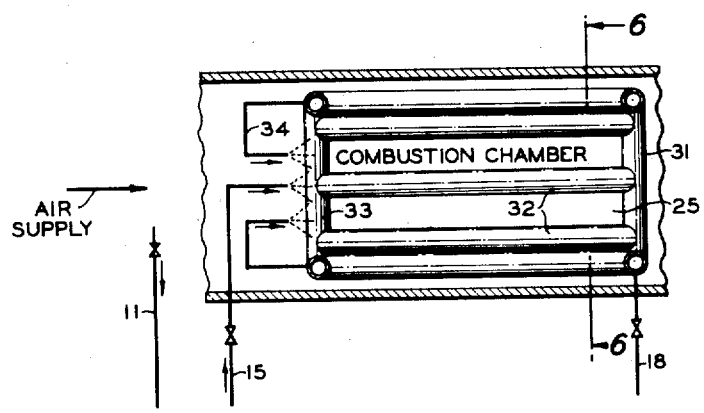
Figure 6:
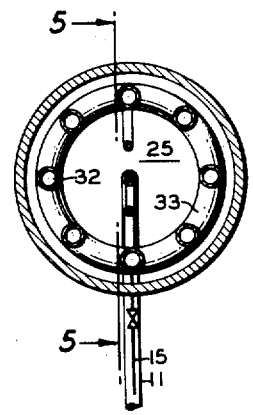
Figure 7:
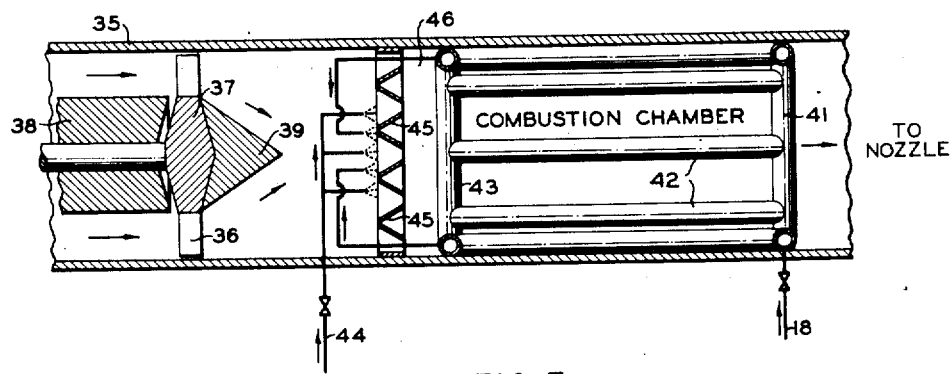

Better understanding of the invention will be obtained upon study of the attached drawings in which Figure 1 is a diagrammatic sectional elevation of a combustion chamber and reforming chamber of a jet engine, together with a flow diagram showing a preferred fuel supply system for the jet engine. Figure 2 is a cross-section taken at the line 2—2 of Figure 1. Figure 3 is a modified sectional elevation of a combustion chamber and reforming chamber of a jet engine, together with a portion of a fuel system flow diagram therefor. Figure 4 is a vertical cross-section taken at line 4—4 of Figure 3. Figure 5 is a sectional elevation of another combustion chamber and reforming chamber of a jet engine, together with a portion of a fuel system flow diagram therefor. Figure 6 is a cross-section view taken at the line 6—6 of Figure 5. Figure 7 is a sectional elevation of an afterburner chamber, together with a reforming chamber and a portion of a fuel system flow diagram for a jet engine.

Referring particularly to Figure 1 of the drawings, air is supplied to the combustion chamber through the air intake portion of the jet engine. A stream of air is diverted through conduit 11 and pressurizing means, such as pump 12, to carburetor 13. Hydrocarbon fuel, such as kerosene, normal paraffins, aromatics and/or other hydrocarbon fractions, is supplied from a fuel tank 14 through conduit 15 and pump 16 to the forward portion of the combustion chamber. A portion of the fuel is diverted from conduit 15 through conduit 17 to carburetor 13 and is sprayed into the air within the carburetor. Carburetor 13 may be heated to effect vaporization if so desired, but this is not a necessary feature of the invention. The fuel-air mixture is removed from carburetor 13 through conduit 18 and is passed through flame arrestor 19 to inlet manifold 21 of reformer chamber 22. If the fuel reforming is to be obtained in contact with a catalyst 20, the catalyst such as the one described above is provided within reformer chamber 22. Reformer chamber 22 surrounds a portion of the combustion chamber and is in indirect heat exchange therewith. The reformer chamber as shown is an annular chamber surrounding the combustion chamber. It may be a plurality of parallel tubes extending between two headers or it may be a single or a plurality of helical tubes extending about the combustion chamber. If thermal reforming is to be utilized, reformer chamber 22 is ordinarily unrestricted throughout its entire length. Reformer chamber 22 encompasses a portion of the length of the combustion chamber and obtains heat required for reformation of the fuel within chamber 22 by indirect heat exchange with the combustion chamber.

The hydrocarbon fuel is reformed within the reforming chamber to form a mixture whcih is high in hydrogen content. The resulting reformed fuel mixture from the reforming chamber is collected in outlet manifold 23 of reformer chamber 22 and is passed by means of conduit 24 into the forward portion of the combustion chamber, together with the unreformed fuel portion. The composite fuel mixture is burned in the combustion chamber and subsequently passes to the power producing zone, not shown. In this embodiment of the invention, the total amount of air and fuel is substantially the same as that normally used in the operation of jet engines. A large difference between this operation and the one normally used for conventional jet engines is that, because of the reformation of a part of the fuel the volume of combustion chamber 25 may be considerably smaller than is normally required for conventional jet engines. Other differences are found in at least a partial overcoming of inherent defects of operation of jet engines for the reason that the reformed fuel has a much higher flame speed than do conventional hydrocarbon fuels.

In one modification of the above embodiment of the invention wherein the jet engine is a turbojet, a portion or all of the reformed fuel mixture is diverted from conduit 24 through conduit 9 to a secondary combustion chamber better known as an afterburner section where it is used as fuel to add energy to the gases obtained from the turbine and prior to the exhaust of those gases from the exhaust nozzle.

In Figure 3 of the drawings, air and fuel are supplied to the combustion chamber and reformer chamber in the same manner as disclosed in connection with the discussion of Figure 1 above. The fuel-air mixture which is obtained in the carburetor is introduced through line 18 into reformer chamber 28. Although a single reformer chamber section is shown in Figure 3 of the drawings, additional reformer chamber sections may be provided at and spaced about the periphery of combustion chamber 25 as shown by chambers dotted in in Figure 4 of the drawings. The resulting reformed fuel mixture is removed from reformer chamber 28 through conduit 29 and is introduced into the forward portion of the combustion chamber 25 through inlet nozzles, together with the portion of unreformed fuel material. When additional reformer chamber sections are required such as those shown in Figure 4 of the drawings, it will be desirable to connect those reformer chamber sections by manifold means at their inlet and outlet ends.

Figure 5 shows a section of a jet engine which differs from that shown in Figure 3 of the drawings by the removal of the reformer chamber sections from a position such that they contact the outer surface of the combustion chamber. This modification of the jet engine has the advantage of allowing the confining surface of the combustion chamber 25 to be cooled, for example, by an ambient air stream, without interfering with the operation of the reformer chamber sections. It will thus be apparent that greater efficiency is obtained in maintaining the reformer chamber sections at high temperatures while maintaining fewer parts of the jet engine at the high combustion temperatures. The operation of the jet engine shown in Figure 5 of the drawings is similar to that described in connection with Figures 1 and 3 of the drawings. The desired fuel-air mixture is introduced by means of conduit 18 into inlet header member 31 and is passed through reformer chamber sections 32 to outlet header 33. The resulting reformed fuel mixture is introduced into the forward portion of the combustion chamber through conduit 34 concomitant with the introduction of the hydrocarbon fuel thereinto through conduit 15.

In Figure 7 of the drawings, a modified portion of a jet engine is shown such as is used in a turbo-jet engine. As pointed out above, it is desirable to maintain the turbine blades at as low a temperature as possible while producing the energy required by expansion of the fuel. Thus a portion of the fuel is conventionally introduced into an afterburner section of the jet engine where further expansion is obtained to produce an additional amount of thrust for the engine.

In the device shown in Figure 7 of the drawings, combustion gases from the primary combustion zone are directed by engine housing 35 and shaft housing 38 against turbine blades 36, these blades being connected to turbine wheel 37 which is in turn connected to a shaft which transmits power to an axial flow compressor, not shown. The gases leaving the turbine blades pass downstream over hub 39 and into the afterburner chamber portion. A fuel-air mixture similar to that described in connection with Figures 1, 3, and 5 is introduced through conduit 18 into inlet manifold 41 and the mixture is reformed in reformer chamber sections 42 and is thereafter collected in outlet manifold 43 and supplied to the afterburner section, together with unreformed fuel supplied to the afterburner section through conduit 44. The unreformed and reformed fuel materials are supplied to the afterburner section upstream of or adjacent to a suitable flame holder 45, which elements are well known in the jet engine art, and burn in the afterburner chamber 46. The combustion gases pass from this afterburner chamber to a thrust producing nozzle, not shown. The reforming chamber sections, as shown in Figure 7 of the drawings, are in contact with the hot gases in the combustion chamber of the afterburner section and are thus maintained at suitable conditions of temperature for producing the reformed fuel.

The amount of hydrocarbon fuel which is reformed is dependent, generally, upon the hydrogen content desired in the total fuel mixture. As little as 1 mol per cent of hydrogen, based upon the total fuel, has a beneficial effect in increasing the overall flame velocity of that fuel. It is desired to reform a sufficient amount of the hydrocarbon fuel to provide between 1 and 700 mol per cent of hydrogen based on the original fuel.

Continuous flow type jet engines are operated when the fuels discussed hereinabove are supplied to a given engine at a fuel-air ratio ranging between 0.005 and 0.10. A turbo-jet engine is operated at a fuel-air ratio within the range of 0.005 to 0.040, preferably between 0.01 to 0.03. A ram jet engine operates at a fuel-air ratio ranging between 0.01 and 0.10, preferably between 0.03 and 0.07. It is within the scope of this invention to operate the jet engine with the fuel described above and with the injection of oxygen. If oxygen or an oxygen-supplying compound, such as peroxide, is used for the purpose of supplying oxygen rather than air, the fuel-air ratio would necessarily have to be adjusted accordingly so as to maintain a fuel-oxygen ratio equivalent to the fuel-air ratio disclosed herein. Air is supplied to such jet engines at a combustor inlet air pressure of between 0.2 to 40 atmospheres at a mach number ranging between 0.01 and 1.0. "Mach number" is defined as the ratio of the velocity of a gas to the local velocity of sound in the gas. A turbo-jet combustor is operated at an inlet air pressure between 0.2 and 30 atmospheres, preferably between 0.5 and 10 atmospheres at a mach number between 0.01 and 0.80, preferably between 0.02 and 0.30. A ram jet engine operates at an inlet air pressure of between 0.5 and 40 atmospheres, preferably between 1 and 10 atmospheres and at a mach number between 0.1 and 1.0, preferably between 0.3 and 1.0. Fuel is supplied to the combustor of such jet engines at a temperature ranging between 400° R and 700° R. The gas turbine has a preferred fuel inlet temperature of between 500° R and 560° R while the ram jet engine has a preferred fuel inlet temperature of between 500° R and 550° R. Air which is supplied to the combustor is preferably supplied at a temperature between 430° R and 1500° R. The turbo-jet engine is operated at an inlet air temperature between 430° R and 1200° R, preferably between 550° R and 900° R. A ram jet engine operates at an inlet air temperature between 500° R and 1500° R, preferably between 600° R and 1000° R. When operating these engines within the above range of conditions, the jet engine fuel of this invention burns within a combustion efficiency range of between 40 per cent and 100 per cent, and ordinarily within the range of from 85 per cent to 100 per cent. The exact fuel-air ratio which is utilized is dependent upon engine design limitations, such as turbine durability and the like. Fuel injection temperatures are dependent upon fuel characteristics such as freezing point and volatility characteristics, as well as upon injection nozzle characteristics.

Pulse jet engines are operated with the greatest efficiency when the fuels discussed hereinbefore are supplied to a given engine at fuel-air ratios ranging between 0.01 and 0.08. It is preferred to operate such an engine while maintaining the fuel-air ratio ranging between 0.03 and 0.07. Much difficulty is encountered in attempting to measure the exact amount of air actually supplied to a pulse jet engine because of the fact that up to about 30 per cent by volume of air may enter the combustion zone through the exhaust zone. A given pulse jet engine may be operated in a range of between 30 and 400 cycles per second, depending upon the size of the engine. By the term "cycle," I mean to include fuel-air inlet, combustion, and exhaust. Operation of a pulse jet engine under the above conditions results in a "temperature rise" which may range from about 800° R. to about 4500° R.

I have disclosed my invention heretofore as applied to the general use of a hydrocarbon fuel, such as kerosene, normal paraffins, aromatics, and other hydrocarbon fractions. The best operation as pertains to the reforming step will be obtained upon utilization of a fuel having a high hydrogen to carbon ratio. Paraffinic-type materials are particularly well adapted to this requirement. For that reason, I prefer to use paraffinic materials for the purpose of reforming to obtain the fuel mixture consisting essentially of carbon monoxide and hydrogen. This result is obtained upon utilization of a single common fuel which is predominantly paraffinic, but when the major portion of the fuel is aromatic it is at times preferred to utilize a separate paraffin fuel portion for the purpose of reforming. In such operation, the resulting reformed fuel mixture is introduced into the combustion chamber together with the unreformed fuel portion as has been discussed hereinbefore. The hydrocarbon fuel which is utilized in my method of operating jet engines preferably boils within the range of between 550° R. and 960° R. The predominantly paraffinic fuel portion which is subjected to the reforming step of this invention is also preferably one which boils within this temperature range.

Many other modifications of this invention will be apparent to those skilled in the art upon study of the accompanying disclosure and drawings. These modifications will be obvious and are believed to be within the spirit and the scope of this disclosure.

I claim:

1. An improved method for operating a jet engine which comprises in combination the steps of passing a hydrocarbon fuel portion together with air in an amount less than that theoretically required for complete combustion of that fuel portion through a reformer zone in indirect heat exchange with hot gases passing through said jet engine and under such conditions of temperature as to reform said hydrocarbon fuel to form a fuel mixture consisting essentially of carbon monoxide and hydrogen; introducing an unreformed fuel portion into the forward portion of a primary combustion zone of said jet engine; introducing said reformed fuel mixture into a gas stream within a combustion zone in said jet engine; burning said unreformed fuel portion and said fuel mixture in the presence of air in said jet engine so as to obtain a sufficient temperature rise through said jet engine to provide motivating thrust to said jet engine by rearward exhaust of hot gases therefrom.

2. An improved method for operating a jet engine which comprises in combination the steps of passing a hydrocarbon fuel together with air in an amount within the range of 0.6 mol to 1.0 mol per atom of carbon in that fuel portion through a reformer zone in indirect heat exchange with hot gases passing through said jet engine and under such conditions of temperature as to reform said hydrocarbon fuel to form a fuel mixture consisting essentially of carbon monoxide and hydrogen; introducing an unreformed fuel portion into the forward portion of a primary combustion zone of said jet engine; introducing said reformed fuel mixture into a gas stream within a combustion zone in said jet engine; burning said unreformed fuel portion and said fuel mixture in the presence of air in said jet engine so as to obtain a sufficient temperature rise through said jet engine to provide motivating thrust to said jet engine by rearward exhaust of hot gases therefrom.

3. The method of claim 2, wherein said reforming is accomplished in the presence of a reforming catalyst at a temperature of at least 1860° R.

4. The method of claim 3, wherein said reforming is accomplished in the presence of a reforming catalyst selected from the group consisting of nickel, iron and alumina; and reforming at a temperature in the range of between 1860° R. and 2400° R.

5. The method of claim 2, wherein said reforming is accomplished thermally at a temperature of at least 2460° R.

6. The method of claim 5, wherein said reforming is accomplished thermally at a temperature of between 2460° R. and 3000° R.

7. The method of claim 2, wherein said reforming is accomplished in the presence of a reforming catalyst selected from the group consisting of nickel, iron, and alumina, said reforming being obtained at a temperature in the range of between 1860° R. and 2400° R; and introducing said reformed fuel mixture into the forward portion of a primary combustion zone of said jet engine.

8. The method of claim 2, wherein said reforming is accomplished in the presence of a reforming catalyst selected from the group consisting of nickel, iron, and alumina, said reforming being obtained at a temperature in the range of between 1860° R. and 2400° R; and introducing and burning said reformed fuel mixture into the forward portion of an afterburner zone of said jet engine.

9. The method of claim 2, wherein said reforming is thermally accomplished at a temperature within the range of 2460° R to 3000° R; and said reformed fuel mixture is introduced into the forward portion of a primary combustion zone of said jet engine.

10. The method of claim 2, wherein a predominantly paraffinic fuel boiling within the range of between 550° R and 960° R is passed through said reformer zone at a temperature of at least 1860° R.

DONALD E. CARR.

References Cited in the file of this patent

UNITED STATES PATENTS

| Number | Name | Date |
|---|---|---|
| 969,368 | Harding | Sept. 6, 1910 |
| 1,372,121 | Davis | Mar. 22, 1921 |
| 2,541,900 | Williams | Feb. 13, 1951 |